United States Patent [19]
Endo et al.

[11] Patent Number: 5,733,830
[45] Date of Patent: Mar. 31, 1998

[54] BETA-ALUMINA ELECTROCAST REFRACTORIES

[75] Inventors: Shigeo Endo; Kimio Hirata; Shozo Seo, all of Tokyo, Japan

[73] Assignee: Toshiba Monofrax Co., Ltd., Japan

[21] Appl. No.: 712,022

[22] Filed: Sep. 11, 1996

[30] Foreign Application Priority Data

Oct. 5, 1995 [JP] Japan .................................. 7-282412

[51] Int. Cl.⁶ .................................................. C04B 35/113
[52] U.S. Cl. ........................ 501/127; 501/153; 110/338
[58] Field of Search ................................. 501/127, 153; 110/338

[56] References Cited

U.S. PATENT DOCUMENTS

| | | | |
|---|---|---|---|
| 2,043,029 | 6/1936 | Blau et al. | 501/127 |
| 4,139,394 | 2/1979 | Esnoult et al. | 501/105 |
| 4,797,269 | 1/1989 | Bauer et al. | 501/118 |
| 4,937,214 | 6/1990 | Morita et al. | 501/127 |
| 5,028,572 | 7/1991 | Kim et al. | 501/103 |
| 5,188,994 | 2/1993 | Schikawa et al. | 501/153 |
| 5,229,340 | 7/1993 | Nemoto | 501/119 |
| 5,612,154 | 3/1997 | Kajita et al. | 429/193 |

FOREIGN PATENT DOCUMENTS 3893  5/1973  Japan.

*Primary Examiner*—Mark L. Bell
*Assistant Examiner*—Louis M. Troilo
*Attorney, Agent, or Firm*—Lorusso & Loud

[57] ABSTRACT

A β-alumina electrocast refractory formed of a composition of 91–95 wt. % of $Al_2O_3$, 2.0 wt. % or less of $K_2O$, 4.0–7.0 wt. % of $Na_2O$ and $K_2O$ in total, 0.15–2.0 wt. % of BaO, SrO and CaO in total, and 0.1 wt. % or less of $Fe_2O_3$ and $TiO_2$ in total.

5 Claims, No Drawings

BETA-ALUMINA ELECTROCAST REFRACTORIES

BACKGROUND OF THE INVENTION

The present invention relates to β-alumina electrocast refractories useful for the crowns of glass-melting furnaces employing oxygen as the combustion gas.

Corundum, corundum-β-alumina, and β-alumina electrocast refractories are among the high alumina content electrocast refractories which are now being used for building glass-melting furnaces. Beta-alumina electrocast refractories contain mainly $Al_2O_3$ and $Na_2O$ and a small amount of $SiO_2$ and, structurally, are composed of β-alumina crystals. For this reason, β-alumina electrocast refractories do not react with alkaline vapor, and have the highest heat-shock resistance of the electrocast refractories mentioned above. Thanks to these properties, β-alumina electrocast refractories have been chiefly used for the superstructures of glass-melting furnaces, which do not come into contact with the raw molten glass.

The superstructure of a glass-melting furnace includes a crown and side wall. The crown is typically made of refractory blocks and formed into the shape of an arch. When the width of the arched crown is as small as 3–4 m, only a low load acts on the blocks. However, when the width of the arch is as large as 7–8 m, the load which acts on the blocks is extremely high. Accordingly, refractories used for the crowns of furnaces are required to have compressive strength sufficiently high to withstand such high loads.

β-alumina electrocast refractories have been used mainly for the side walls or other furnace structure on which only a low load acts and it has been difficult to use such refractories for arched crowns having large widths because of insufficient mechanical strength.

Recently, the tendency in the industry has been to raise the glass-melting temperature in order to obtain a glass product of improved quality. This tendency has created a need for refractories for use in the superstructures of glass-melting furnaces having a higher resistance to heat.

Furthermore, the currently favored combustion method employed for melting glass uses oxygen, rather than air. The purpose of this conversion to oxygen is to decrease the NOx content of gas exhausted from the glass-melting furnace. In addition to this, the combustion method using oxygen is highly advantageous in that a glass product of improved quality can be obtained and in that a regenerator is not required as a part of the furnace.

Combustion methods using oxygen include a method in which only oxygen is used, instead of air, and a method in which both air and oxygen are used. In either case, oxygen is used for combustion, so that the amount of gas, which is necessary for combustion, is considerably decreased. As a result, the gas pressure in the furnace is lower, and the furnace atmosphere, in particular, the atmosphere in the melting tank, is completely different from that present in the combustion method using air.

Because when oxygen is used for combustion, the amount of gas which passes through the furnace and the furnace pressure are reduced, as compared with the case of combustion using air, and the concentration of alkalis volatilized from the molten glass is extremely high in the furnace atmosphere, i.e. the furnace atmosphere is saturated or almost saturated with the alkali vapors.

In such an atmosphere of extremely high alkali content, silica bonded bricks which have previously been used for the superstructures of glass-melting furnaces are melted and damaged within a short period of time. While AZS or high alumina electrocast refractories might be expected to be durable in an alkaline atmosphere, when substituted for the silica bonded bricks, there is a strong possibility that AZS electrocast refractories would contaminate the molten glass by exudation of matrix glass from refractories and, therefore, they can be used only for limited portions of the furnace.

Further, β-alumina contained in a high alumina electrocast refractory transforms to corundum in the case where air is used for combustion, in which case the alkali content of the furnace atmosphere is low, and the corundum serves as a protective layer. The refractory therefore shows corrosion resistance. However, in the case where oxygen is used for combustion, in which case the alkali content of the furnace atmosphere is high, the reverse occurs in that corundum transforms to β-alumina. When this latter transformation occurs, the volume of the refractory is rapidly increased, and plastic deformation, so-called creep, is caused in the refractory at elevated temperatures. For this reason, high alumina electrocast refractories containing a large amount of corundum are not suitable for exposure to an atmosphere of high alkali content.

SUMMARY OF THE INVENTION

An object of the present invention is to provide β-alumina electrocast refractories which have high compressive strength and which are not easily corroded by alkaline vapor.

Accordingly, the present invention provides a β-alumina electrocast refractory having composition of 91–95% by weight of $Al_2O_3$, 4.0–7.0% by weight of $Na_2O$ and $K_2O$ in total, 0.15–2.0% by weight of BaO, SrO and CaO in total, and 0.1% by weight or less of $Fe_2O_3$ and $TiO_2$ in total.

The total amount of $Na_2O$ and $K_2O$ is adjusted to 4.0–7.0%. These components react with $Al_2O_3$ to form β-alumina crystals. When the total amount of these components is less than 4.0%, a large amount of corundum is formed, in addition to β-alumina. When such a refractory is used in the previously-described atmosphere which is saturated with alkaline vapor, corundum transforms to β-alumina, and the crystal structure is thus broken down. On the other hand, when the total amount of $Na_2O$ and $K_2O$ is in excess of 7.0%, excessive $Na_2O$ and $K_2O$ are present between crystals and these components are readily dissolved by moisture from the gaseous atmosphere or penetrating water. When such dissolution occurs, cracking or the like may be caused in the refractory even at room temperature, and β-alumina crystals may also gradually fall off (spall). In the present invention it is permissible to reduce the $K_2O$ content to substantially zero.

Accordingly, in the present invention, the amount of $K_2O$ is adjusted to 2.0% or less. The ionic radius of K is larger than that of Na. By allowing a small amount of β-alumina containing $K_2O$ and β-alumina containing $Na_2O$ to co-exist, it is possible to increase the strength of the crystals themselves. When the amount of $K_2O$ is too large, the crystals themselves have decreased mechanical strength.

BaO, SrO and CaO have the effect of preventing β-alumina crystals from growing to excessive size. In order to fully obtain this effect, the total amount of these components is adjusted to 0.15–2.0%. When the total amount of these components is less than 0.15%, the above effect cannot be fully obtained. When the total amount is in excess of 2.0%, a large amount of crystals having a spinel structure, composed of BaO, SrO or CaO and $Al_2O_3$, are formed.

These crystals are readily corroded by alkaline vapor, and also adversely affect the creep characteristics at elevated temperatures. In the present invention it is permissible to reduce the content of any one of BaO, SrO and CaO to substantially zero.

$SiO_2$ is a glassy-phase-forming component. When the amount of this component is too large, the refractory shows large creep. Therefore, the amount of $SiO_2$ is adjusted to 0.5% or less.

The total amount of $Fe_3O_3$ and $TiO_2$ is adjusted to 0.1% or less. These two components form a low-melting-point glass. Since low-melting-point glass has less resistance to heat, these components are unfavorable for refractories. In addition, these components tend to color the final product.

The β-alumina electrocast refractories of the present invention have the above-described composition so that they can have, without undergoing a great change in specific gravity, excellent compressive strength, sufficiently high to be safely used for the crowns of glass-melting furnaces, and, at the same time, low creep and high resistance to corrosion, even when exposed to a furnace atmosphere saturated with alkali, such as an atmosphere in a furnace employing oxygen for combustion. In the present invention either $Fe_2O_3$ and/or $TiO_2$ may be nil (substantially zero).

When the total amount of $Na_2O$ and $K_2O$ falls within the range of 4.0–7.0%, BaO, SrO and CaO suppress the growth of β-alumina crystals, and allow the crystals to entangle with each other. The refractory thus has increased mechanical strength.

The β-alumina electrocast refractories of the present invention can be readily imparted with a compressive strength of 50 MPa or more. In addition, they show only small creep deformation and are not corroded by alkaline vapor even when exposed to an atmosphere with high alkali content. Therefore, the β-alumina electrocast refractories of the present invention are useful for those parts of the furnace exposed to a high-alkali-content atmosphere and on which high loads act; for example, they can be used for the crowns of glass-melting furnaces employing oxygen for combustion.

Further, in the β-alumina electrocast refractories of the present invention, the matrix glass content can be decreased to several percent or less, and the compressive strength is not excessively decreased even at elevated temperatures at 1800° C. or less. If the refractory has a compressive strength of 50 MPa or more at room temperature, it can be safely used for the crown of a furnace.

DESCRIPTION OF THE PREFERRED EMBODIMENT

Conventional β-alumina electrocast refractories are mainly composed of distinct β-alumina crystals, so that they have high corrosion resistance to alkalis, but have only a low compressive strength of approximately 30 MPa. Thus, they possess insufficient mechanical strength for use in forming a glass furnace and, in particular, would be unreliable in use for wide crowns.

For instance, when a β-alumina electrocast refractory is used for the crown of a glass-melting furnace, having an ordinary width of approximately 6 m, the refractory is required to have a compressive strength of at least 50 MPa. In order to meet this strength requirement, the present invention seeks to suppress the growth of β-alumina crystals in forming the β-alumina electrocast refractory, and to produce a crystalline structure in which the beta-alumina crystals are entangled with each other.

It has now been found that when BaO, SrO, CaO and the like are allowed to coexist along with β-alumina, it is possible to obtain, without greatly changing the specific gravity or porosity, β-alumina electrocast refractories which show high corrosion resistance even in a high-alkali-content furnace atmosphere and which have sufficiently high strength to fully withstand use as bricks for the crowns of furnaces.

The β-alumina electrocast refractories having the compositions shown in Table 1 were prepared as follows. The raw materials were admixed in accordance with the predetermined formulations shown in Table 1, were melted in an arc furnace, and the melts were respectively poured into a carbon mold having internal dimensions of 230×230×230 mm. The molded products were gradually cooled in alumina powder. The products thus obtained had no defect in appearance. For each of these products, the compressive strength, corrosion resistance to alkaline vapor and creep characteristics were tested, and the corundum content was measured. The results are also shown in Table 1.

The compressive strength was measured using a specimen which was a cube 25 mm on edge, cut from a corner of the product. The measurement was carried out by controlling the rate of application of pressure to 10–15 $kg/cm^2$ per second.

The corundum content was measured by using a sample taken from a corner of the product, by the internal standard method using X-ray. β-alumina reagent was used as the standard material.

To test corrosion resistance against alkaline vapor, alkali components and glass were placed in a crucible having an inside diameter of 80 mm to provide an admixture containing 54% by weight of $SiO_2$, 11% by weight of BaO, 15% by weight of $Na_2O$ and 13% by weight of $K_2O$, and the top of the crucible was sealed with a sample having a diameter of 90 mm and a thickness of 20 mm. This was kept in an electric oven at 1580° C. for 96 hours. Thereafter, the thickness at the central portion of the sample was measured, and the measurement of the thickness was converted into reduction per 24 hours to obtain a rate of alkali corrosion.

With respect to the creep characteristics, swelling due to softening and deformation at the central part of the sample used for the corrosion test was measured and taken as creep deformation.

To determine the number of cracks, the sample which had been used for the alkali corrosion test was cut into halves, and the number of cracks appearing on the cut section faces was counted.

In all of the examples, the following were found: a compressive strength of 50 MPa or more; a low rate of corrosion by alkaline vapor; low creep deformation; and a small number of cracks. Moreover, in no case did the corundum content exceed 5%.

COMPARATIVE EXAMPLES

Molded products whose chemical compositions were different from those of the products of the above examples were prepared in the same manner as in the above examples, and were subjected to the same tests and measurements. The chemical compositions of the products, and the results of the tests and measurements are shown in Table 2.

Comparative Example 1 was a case where the amount of $Na_2O$ was low. The rate of corrosion was high, and the deformation caused due to softening was great. In addition, 5 cracks were found in the sample which had been used for the corrosion test. The reason such results were obtained was that, since the compressive strength of the product was high and the corundum content was also high, corundum transformed to β-alumina.

Comparative Examples 2 and 3 are cases where the total amount of BaO, SrO and CaO was low. The strength of the individual β-alumina crystals was low, so that the overall compressive strength was low, and the creep was large. Alkaline vapor penetrated between the crystals, so that the rate of corrosion was high. Cracks were also found.

Comparative Example 3 was a case where the amount of Fe₂O₃ and TiO₂ was high. The creep deformation was larger than that in Comparative Example 2.

Comparative Example 4 was a case where the amount of K₂O and SiO₂ was high. Since the amount of K₂O was high, the compressive strength was low. Further, the amount of SiO₂ was high, so that the creep was large.

Comparative Example 5 was a case where the amount of CaO was high. The rate of corrosion was high, and the creep was large.

Comparative Example 6 was a case where the amount of Na₂O was high.

Comparative Example 7 was a case where the total amount of BaO, SrO and CaO was high. The rate of corrosion was high, and the creep was large.

changes which come within the meaning and range of equivalency of the claims are therefore intended to be embraced therein.

We claim:

1. A beta-alumina electrocast refractory consisting essentially of β-alumina crystals having a composition of 91–95 wt. % of $Al_2O_3$, 2.0 wt. % or less of $K_2O$, 0.5 wt. % or less of $SiO_2$, 4.0–7.0 wt. % of $Na_2O$ and $K_2O$ in total, 0.15–2.0 wt. % of SrO and CaO in total, and 0.1 wt. % or less of $Fe_2O_3$ and $TiO_2$ in total, wherein the beta-alumina electrocast refractory has a compressive strength of 50 MPa or more.

2. A β-alumina electrocast refractory according to claim 1 containing 5 wt. % or less of corundum crystals.

3. A β-alumina electrocast refractory according to claim 1, wherein the growth of the β-alumina crystals is suppressed and said crystals are entangled due to the presence of SrO or CaO.

[TABLE 1]

| Example | 1 | 2 | 3 | 4 | 5 | 6 | 7 | 8 | 9 | 10 |
|---|---|---|---|---|---|---|---|---|---|---|
| $Al_2O_3$ | 95.0 | 94.1 | 93.8 | 93.7 | 93.2 | 93.0 | 92.2 | 91.5 | 91.3 | 91.0 |
| $Na_2O$ | 4.0 | 5.1 | 4.8 | 4.2 | 6.1 | 5.8 | 5.0 | 5.7 | 3.8 | 6.6 |
| $K_2O$ | — | — | 0.5 | 0.7 | — | — | 2.0 | — | 1.5 | — |
| CaO | 0.7 | 0.6 | — | — | 0.4 | 0.7 | 0.2 | 0.5 | — | 1.2 |
| BaO | — | — | 0.7 | — | — | 0.1 | — | 0.6 | 1.0 | 0.8 |
| SrO | — | — | — | 1.1 | — | 0.1 | — | 0.5 | 0.6 | — |
| $SiO_2$ | 0.1 | 0.1 | 0.1 | 0.1 | 0.1 | 0.1 | 0.5 | 0.1 | 0.2 | 0.3 |
| $Fe_2O_3 + TiO_2$ | ≦0.1 | ≦0.1 | ≦0.1 | ≦0.1 | ≦0.1 | ≦0.1 | ≦0.1 | ≦0.1 | ≦0.1 | ≦0.1 |
| Cracking during production | Not caused | Not caused | Not caused | Not caused | Not caused | Not caused | Not caused | Not caused | Not caused | Not caused |
| Bulk specific gravity | 2.91 | 2.89 | 2.88 | 2.89 | 2.97 | 2.89 | 2.88 | 2.87 | 2.86 | 2.88 |
| Compressive strength (Mpa) | 110 | 80 | 90 | 83 | 67 | 71 | 52 | 56 | 58 | 54 |
| Corundum content (%) | 4.8 | 1.1 | 2.6 | 2.1 | 0 | 0.5 | 0 | 0 | 0 | 0 |
| Rate of alkali corrosion ($10^{-2}$ mm/day) | 0.2 | 0.1 | 0.1 | 0.1 | 0.1 | 0.1 | 0.1 | 0.1 | 0.1 | 0.1 |
| Creep deformation (mm) | 0.1 | 0.1 | 0 | 0 | 0 | 0 | 0 | 0 | 0.1 | 0 |
| Number of cracks | 1 | 0 | 0 | 0 | 0 | 0 | 0 | 0 | 0 | 0 |

[TABLE 2]

| Comparative Example | 1 | 2 | 3 | 4 | 5 | 6 | 7 |
|---|---|---|---|---|---|---|---|
| $Al_2O_3$ | 95.8 | 94.2 | 93.0 | 91.5 | 91.2 | 89.1 | 91.4 |
| $Na_2O$ | 3.7 | 4.8 | 6.5 | 3.9 | 5.1 | 8.9 | 5.0 |
| $K_2O$ | — | 0.5 | — | 2.5 | 1.0 | — | 1.0 |
| CaO | 0.3 | 0.1 | — | 0.5 | 2.3 | — | 0.8 |
| BaO | — | — | 0.1 | 0.3 | — | — | 1.0 |
| SrO | — | — | — | 0.5 | — | 1.5 | 0.5 |
| $SiO_2$ | 0.1 | 0.3 | 0.2 | 0.6 | 0.2 | 0.4 | 0.2 |
| $Fe_2O_3 + TiO_2$ | ≦0.1 | ≦0.1 | 0.2 | ≦0.1 | ≦0.1 | ≦0.1 | ≦0.1 |
| Cracking during production | caused | Not caused | Not caused | Not caused | Not caused | caused | Not caused |
| Bulk specific gravity | 3.21 | 2.88 | 2.89 | 2.86 | 2.86 | 2.64 | 2.85 |
| Compressive strength (Mpa) | 93 | 37 | 18 | 41 | 53 | 28 | 52 |
| Corundum content (%) | 9.8 | 3.2 | 0 | 0 | 0 | 0 | 0 |
| Rate of alkali corrosion ($10^{-2}$ mm/day) | 1.2 | 1.0 | 2.6 | 2.4 | 2.2 | 3.3 | 2.5 |
| Creep deformation (mm) | 10.1 | 6.5 | 7.6 | 3.4 | 2.6 | 0 | 3.1 |
| Number of cracks | 5 | 4 | 2 | 3 | 4 | 3 | 5 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all 4. A β-alumina electrocast refractory according to claim 1 formed from a melt of said composition.

5. A beta-alumina electrocast refractory having a beta-alumina refractory composition of 91–95 wt. % of $Al_2O_3$, 2.0 wt. % or less of $K_2O$, 0.5 wt. % or less of $SiO_2$, 4.0–7.0 wt. % in total of at least one alkali oxide selected from the group consisting of $Na_2O$ and $K_2O$, 0.15–2.0 wt. % in total of at least one alkaline earth oxide selected from the group consisting of SrO and CaO, and 0.1 wt. % or less in total of at least one component selected from the group consisting of $Fe_2O_3$ and $TiO_2$, wherein the beta-alumina electrocast refractory has a compressive strength of 50 MPa or more.

* * * * *